E. A. NELSON.
CURTAIN SUPPORT FOR VEHICLE CANOPY TOPS.
APPLICATION FILED DEC. 17, 1912.

1,160,947.

Patented Nov. 16, 1915.
2 SHEETS—SHEET 1.

Witnesses
W. E. Ford
C. B. Belknap

Inventor
Emil R. Nelson
By Whittemore Hulbert & Whittemore
Attys

E. A. NELSON.
CURTAIN SUPPORT FOR VEHICLE CANOPY TOPS.
APPLICATION FILED DEC. 17, 1912.
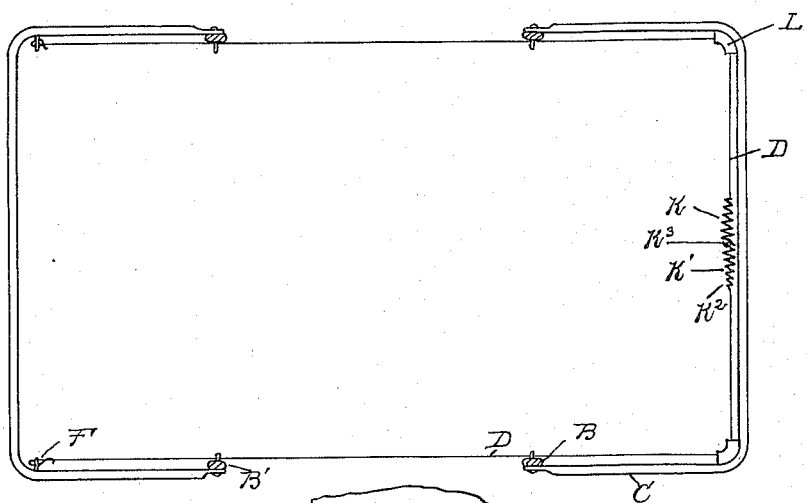
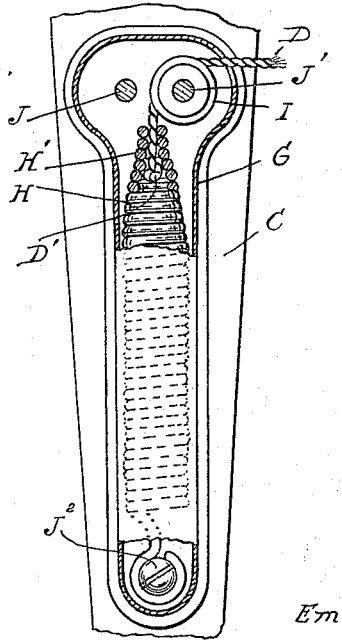
Inventor
Emil A. Nelson under tension on the opposite ends of said cable.

UNITED STATES PATENT OFFICE.

EMIL A. NELSON, OF DETROIT, MICHIGAN.

CURTAIN-SUPPORT FOR VEHICLE CANOPY-TOPS.

1,160,947. Specification of Letters Patent. Patented Nov. 16, 1915.

Application filed December 17, 1912. Serial No. 737,176.

*To all whom it may concern:*

Be it known that I, EMIL A. NELSON, a citizen of the United States of America, residing at Detroit, in the county of Wayne and State of Michigan, have invented certain new and useful Improvements in Curtain-Supports for Vehicle Canopy-Tops, of which the following is a specification, reference being had therein to the accompanying drawings.

The invention relates to vehicle canopy tops of that type in which a support for the curtains is formed by a cable, arranged inside and adjacent to the lower edge of the canopy. A defect of such construction is that after use for some time the cable will stretch and permit the curtains to sag. This I have overcome by a construction of tensioning means for the cable as hereinafter set forth.

Figure 1:
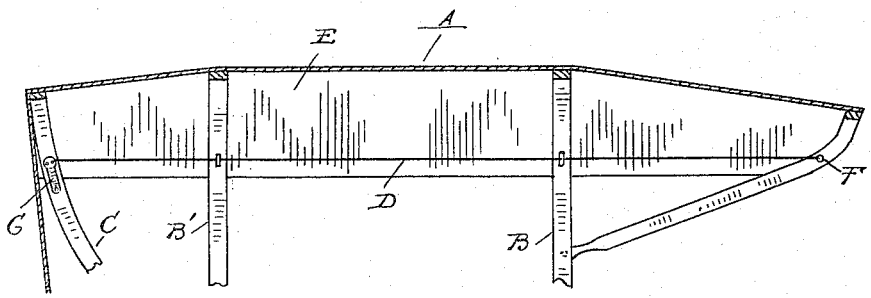
Figure 3:
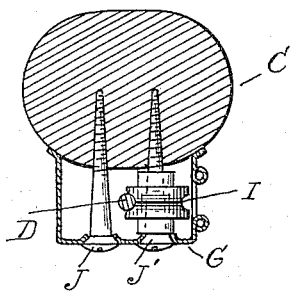

In the drawings: Figure 1 is a longitudinal section through a vehicle canopy top, to which my improvement is applied. Fig. 2 is a side elevation of the tensioning device. Fig. 3 is a cross section thereof on line $x$—$x$ Fig. 2. Fig. 4 is a bottom plan view of the canopy showing a modified construction.

A is a canopy top of usual well-known construction; B and B' are the supporting bows therefor; and C is the diagonal brace extending from one of the bows to the end of the top.

D is a cable extending along the inside of the side E of the top, one end of said cable being anchored at F.

To maintain the cable D taut, I provide resilient tensioning means attached to the opposite end of the cable D from the fixed anchor F. This tensioning device is preferably arranged adjacent to the brace member C, and specifically is preferably of the following construction: G is a fitting, preferably formed of a sheet metal stamping, and which forms a housing for a spring H. I is a pulley within the housing, around which the cable D passes, the end of said cable being attached to the spring. J, J' and J² are screws or securing pins for attaching the fitting G to the brace member C, one of said pins forming a journal for the pulley I, and another forming an anchor for the spring H. The end of the cable passes through a closed coil H' at the end of the spring, and is knotted at D' to prevent withdrawal.

With the construction as described, when the fitting G is attached to the brace C, it will form a complete housing for the spring and pulley. The same construction may be used alternatively on the right or left side of the vehicle, the only change required being the shifting of the pulley I from one to the other of the pins J J'. The spring H, being placed under initial tension, will maintain the cable D taut, compensating for any stretching, or contraction and expansion, due to temperature changes.

In Fig. 4 a modified construction is shown, in which the cable extends continuously on both sides of the canopy, and a single spring or tensioning device places an equal tension on both sides. As shown, two springs, K and K', are secured to the opposite ends of the cable, preferably by contracting the coils of each spring as at K² and knotting the cable to engage with this contracted portion. The opposite ends of the spring are provided with hooks K³ for coupling to each other. The springs are preferably arranged adjacent to the forward bow and the cables pass around and are guided in bearings L at the corners of said bows and at intermediate points.

What I claim as my invention is:

1. In a vehicle canopy, the combination with a top section and a supporting frame therefor, of a curtain-supporting cable extending from front to rear of said top section, a resilient slack-taking-up means for the cable connected to said frame, and a housing for said resilient slack-taking-up means.

2. In a vehicle canopy, the combination with a top section and supporting bows therefor, of a cable extending longitudinally of said top, forming a curtain support, and slack-taking-up means for said cable attached to one of said bows and arranged longitudinally on the inside thereof to be concealed thereby.

3. In a vehicle canopy, the combination with a top section and supporting bows therefor, of a cable extending along said top section and forming a curtain support, and a resilient tensioning means applied to one end of said cable, comprising a hollow fitting on one of said bows, a spring housed therein and attached to one end of said cable, and a pulley around which said cable passes.

4. In a vehicle canopy, the combination with a top supporting bows therefor and a curtain-supporting cable extending longitudinally thereof, of a hollow fitting extending longitudinally of one of said bows, a spring housed therein and attached to one end of said cable, a pulley around which said cable passes, and securing means for said fitting forming a journal for said pulley.

5. In a vehicle canopy, the combination with a top, of a curtain-supporting cable extending longitudinally thereof, a supporting bow or brace member for said top, a hollow fitting adjacent to said brace member, a spring housed within said fitting and connected to one end of said cable, a pulley also housed within said fitting, around which the cable passes, and securing bolts for said fitting forming a journal for said pulley and an anchor for said spring.

6. In a vehicle canopy, the combination with a top, of a supporting bow or brace therefor, a curtain-supporting cable extending longitudinally of said top, a fitting comprising a sheet metal stamping, arranged adjacent to said bow or brace and provided with a body portion and enlarged head, a spring housed within the body portion of said fitting attached to the end of said cable, and a pulley around which said cable passes, housed in the enlarged head of said fitting and exchangeably secured to the right or left of said cable.

7. In a vehicle canopy, the combination with a top, of a supporting bow or brace therefor, a curtain-supporting cable extending longitudinally of said top, a fitting arranged adjacent to said bow or brace, comprising a hollow casing, a spring housed within said casing and secured to the end of said cable, a pulley also housed within said casing and exchangeable in position from left to right of said cable, and securing bolts for attaching said fitting to said bow or brace, forming journals for said pulley in each of its positions and an anchor for said spring.

8. In a vehicle canopy, the combination with a top section, of a cable extending longitudinally of said top, forming a curtain support, means near the edge of the top for changing the direction of said cable, and means beyond said direction changing means for maintaining the cable taut.

In testimony whereof I affix my signature in presence of two witnesses.

EMIL A. NELSON.

Witnesses:
JAMES P. BARRY,
DELBERT COLLINS.

Copies of this patent may be obtained for five cents each, by addressing the "Commissioner of Patents, Washington, D. C."